United States Patent [19]

Havas et al.

[11] Patent Number: 5,306,792

[45] Date of Patent: Apr. 26, 1994

[54] GAS PHASE POLYMERISATION PROCESS

[75] Inventors: Laszlo Havas, Martigues; Claudine Lalanne-Magne, Lavera, both of France

[73] Assignee: BP Chemicals Limited, London, England

[21] Appl. No.: 746,473

[22] Filed: Aug. 16, 1991

[30] Foreign Application Priority Data

Aug. 31, 1990 [FR] France ............................... 90 11059

[51] Int. Cl.⁵ ................................................ C08F 4/24
[52] U.S. Cl. .................................... 526/106; 526/901; 526/88
[58] Field of Search ............................... 526/106, 901

[56] References Cited

U.S. PATENT DOCUMENTS 3,023,203  2/1962  Dye .................................... 526/106

FOREIGN PATENT DOCUMENTS 747549   9/1974  Belgium .
475861   5/1976  European Pat. Off. .
0337365 10/1989  European Pat. Off. .
0376559  4/1990  European Pat. Off. .
49-029301 8/1974 Japan .

Primary Examiner—Joseph L. Schofer
Assistant Examiner—Tom Weber
Attorney, Agent, or Firm—Brooks Haidt Haffner & Delahunty

[57] ABSTRACT

The present invention relates to a continuous process for the polymerization of an alpha-olefin having from 2 to 12 carbon atoms, which is carried out in a gas phase polymerization reactor by bringing a gaseous reaction mixture containing the alpha-olefin to be polymerized into contact with a catalyst based on chromium oxide associated with a catalyst based on chromium oxide associated with a granular support and activated by a heat treatment in which the polymerization reactor is fed with (a) alpha-olefin and (b) catalyst at constant rates.

14 Claims, 1 Drawing Sheet

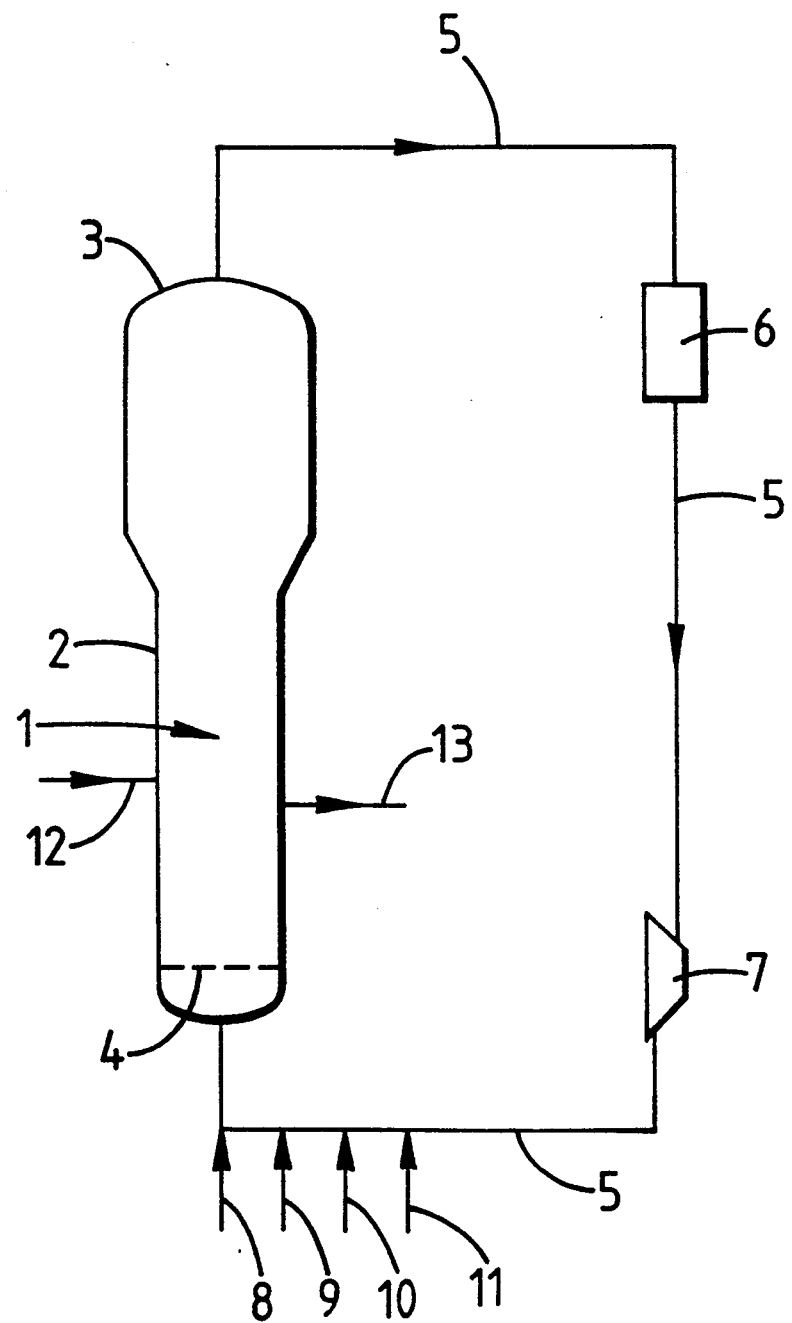

GAS PHASE POLYMERISATION PROCESS

The present invention relates to an alpha-olefin polymerization process carried out in a gas phase polymerization reactor fed with alpha-olefin and with a catalyst based on chromium oxide.

It is known to polymerize continuously one or more alpha-olefins, such as for example ethylene, in the gas phase, in a reactor with a fluidized and/or mechanically agitated bed, in the presence of a catalyst based on chromium oxide associated with a granular support and activated by a heat treatment. the polymer particles which are being formed are kept in the fluidized and/or agitated state in a gaseous reaction mixture containing the alpha-olefin or alpha or alpha-olefins which are introduced into the reactor. The catalyst is introduced continuously or intermittently into the reactor while the polymer constituting the fluidized and/or mechanically agitated bed is withdrawn from the reactor, again continuously or intermittently. Generally the gaseous mixture leaves through the top of the reactor and is recycled to the reactor through a recycle conduit and a compressor. During this recycling the gaseous mixture is generally cooled with the aid of a heat exchanger so as to remove the heat produced during the polymerization reaction.

It is known, according to EP-A-376 559 to carry out a gas phase polymerization process by maintaining substancially constant certain operating conditions. This is an example of the known processes in which the partial pressures of the main constituants of the gaseous reaction mixture as well as the total pressure of this gaseous reaction mixture within the reactor are maintained constant. However in this case it has been found that small variations in the progress of the polymerization can cause an unexpected increase in the quantity of heat evolved by the polymerization reaction. These small variations in the polymerization conditions can result especially from slight unavoidable variations in the quality of the catalyst or of the alpha-olefins employed in the reaction, or from variations in the feed rate of the catalyst or withdrawal rate of the polymer produced, the residence time of the polymer in the reactor or else the composition of the gaseous reaction mixture. These variations in the progress of the polymerization are particularly troublesome in a gas phase polymerization process as compared with slurry or solution polymerization processes because of the fact that the heat exchange capacity of a gas phase is much lower than that of a liquid phase. Thus an increase in the quantity of heat which cannot be removed sufficiently rapidly and efficiently by the gaseous reaction mixture can give rise to the appearance of hot spots in the bed and to the formation of agglomerates caused by melting polymer. When hot spots appear in the bed, it is generally too late to prevent the formation of agglomerates. Nevertheless, if the reaction conditions are corrected sufficiently early, for example, if the polymerization temperature or else the rate of feed of the catalyst into the reactor is reduced, the detrimental effects of superactivation can be limited. Such actions can reduce the amount and size of the agglomerates formed to a certain extent, but it will not be possible to prevent a fall, in the production and quality of the polymer manufactured during this period. As a result it is generally accepted that if it is desired to avoid these disadvantages, the general polymerization conditions should be chosen with a safety margin such that the hot spots and agglomerates are unlikely to form.

It is also observed, in such a process, that the variations in the progress of the polymerization make it difficult or even impossible to obtain a polymer with a constant quality and, in particular, a uniform melt flow index.

A gas phase alpha-olefin polymerization process has now been found which makes it possible to avoid or at least mitigate the afore-mentioned disadvantages. In particular, the process enables polymers to be manufactured continuously with a high productivity and a constant or substantially constant quality, which process is able to accommodate small variations in the progress of the polymerization without the formation of agglomerates.

The present invention therefore relates to a continuous process for the polymerization of an alpha-olefin having from 2 to 12 carbon atoms, which is carried out in a gas phase polymerization reactor by bringing a gaseous reaction mixture, containing the alpha-olefin to be polymerized, into contact with a catalyst based on chromium oxide associated with a granular support and activated by a heat treatment, said process being characterized in that the polymerization reactor is fed with (a) alpha-olefin and (b) catalyst at constant rates.

According to the present invention, it is generally accepted that a rate is constant if it does not vary by more than 5%, preferably by not more than 2%, and that a ratio of two quantities is constant if it does not vary by more than 10%, preferably by not more than 5%.

According to the present invention, the gas phase polymerization reaction must be carried out in a reactor which is fed with alpha-olefin at a constant rate, as a result of which there are variations in the total pressure of the gaseous reaction mixture and/or the partial pressure of alpha-olefin in the polymerization reactor. It is found, that the process of the invention permits efficient regulation of the polymerization reaction, irrespective of the variations in the progress of the polymerization, thereby avoiding the formation of hot spots and agglomerates. Thus it is observed that a rise or fall in this quantity of heat is automatically counteracted respectively by a fall or rise in the partial pressure of alpha-olefin. More particularly, it is also found that the polymerization rate is also regulated by variations in the partial pressure of alpha-olefin when slight fluctuations occur in the quality of the constituents of the gaseous reaction mixture and/or the catalyst. One of the advantages of the process is the ability to produce polymer without undue concern for the formation of hot spots and agglomerates due to unavoidable variations in the progress of the polymerization. Another advantage of the process is that the polymerization is directly regulated by maintaining constant the feed rate of alpha-olefin. Advantageously the latter is kept constant during the polymerization with the aid of a flow regulating system.

Furthermore, the polymerization reactor must be fed with catalyst at a constant rate. In fact, it is found, unexpectedly, that this condition is also essential for obtaining a polymer of constant quality and especially for obtaining a polymer with a uniform melt flow index during the polymerization.

According to the process of the invention, the total pressure of the gaseous reaction mixture is most frequently between 0.5 and 5 MPa, preferably between 1.5 and 2.5 MPa, and can vary freely, preferably with maximum variations of less than 0.3 MPa and in most cases of the order of 0.1 MPa. However, for general safety reasons, the pressure of the gaseous mixture does not generally exceed a predetermined maximum pressure which depends essentially on the reactor used. The latter can advantageously be vented as soon as the pressure of the gaseous reaction mixture reaches the maximum pressure. Furthermore, the pressure of the gaseous reaction mixture is preferably kept above a predetermined minimum pressure which must permit a minimum and sufficient removal of the heat evolved by the polymerization. When the polymerization is carried out in a fluidized bed reactor, this minimum pressure must also permit a sufficient fluidization velocity to ensure a good fluidization of the polymer particles forming in the fluidized bed. The pressure of the gaseous reaction mixture is kept above the minimum pressure by introducing an inert gas having a good heat exchange capacity, such as nitrogen, into this gaseous mixture. Said inert gas can be introduced by means of a pressure control device. The gaseous reaction mixture generally contains a variable volume of inert gas ranging from 20 to 60%.

According to the process of the invention, the partial pressure of alpha-olefin can also vary freely. However, in order to limit the polymerization rate, the partial pressure of alpha-olefin most frequently represents at most 60% and preferably 40% of the maximum pressure of the gaseous reaction mixture. Furthermore, in order to avoid an excessive reduction in the heat exchange capacity of the gaseous reaction mixture and an excessive reduction in the polymerization rate, the partial pressure of alpha-olefin generally represents at least 10% and preferably at least 20% of the minimum pressure of the gaseous reaction mixture.

Apart from the alpha-olefin to be polymerized, the gaseous reaction mixture can contain a chain limiter such as, for example, hydrogen. It is preferably introduced into the polymerization reactor at a rate which makes it possible to maintain a constant partial pressure of chain limiter in the gaseous reaction mixture. This pressure is advantageously kept constant by means of a regulating system which controls the rate of introduction of chain limiter. This partial pressure preferably represents less than 20% and more particularly from 15 to 18% of the pressure of the gaseous reaction mixture and is generally of the order of 0.3 MPa.

According to the invention, the alpha-olefin can be polymerized with one or more different alpha-olefins having from 2 to 12 carbon atoms, which are hereinafter called comonomers and are used in smaller amounts. A comonomer can be introduced into the polymerization reactor at a constant rate. However, to produce a polymer of constant density, a comonomer is preferably introduced into the polymerization reactor at a rate which enables the ratio of the partial pressure of comonomer to the partial pressure of alpha-olefin in the gaseous reaction mixture to be kept constant. This ratio is advantageously kept constant by means of a regulating system which controls the rate of introduction of comonomer. Furthermore, this ratio is generally less than 0.20 and preferably less than 0.1.

By virtue of the process of the invention, it is possible to employ catalysts based on chromium oxide which have a very high efficiency and whose polymerization activity is particularly sensitive to slight variations in the polymerization conditions. The polymerization catalyst used comprises a refractory oxide compound and is activated by a heat treatment which is advantageously carried out at a temperature of at least 250° C. and at most equal to the temperature at which the granular support starts to sinter, and under a non-reducing atmosphere, preferably an oxidizing atmosphere. This catalyst can be obtained by a large number of known processes, especially by those comprising two steps in which, in a first step (A), a chromium compound such as a chromium oxide generally of the formula $CrO_3$, or a chromium compound capable of being converted to chromium oxide by calcination, such as, for example, a chromium nitrate or sulphate, an ammonium chromate, a chromium carbonate, acetate or acetylacetonate or a tert-butyl chromate, is associated with a granular support based on a refractory oxide such as, for example, silica, alumina, zirconium oxide, thorium oxide, titanium oxide or mixtures or coprecipitates of two or more of these oxides and in a second step (B), the chromium compound associated with the granular support in step (A) is subjected to a so-called activation operation by heat treatment at a temperature of at least 250° C. and at most equal to the temperature at which the granular support starts to sinter; the temperature of the heat treatment is generally between 250° and 1200° C. and preferably between 350° and 1000° C. This heat treatment is carried out under a non-reducing atmosphere, preferably under an oxidizing atmosphere, which generally consists of a gaseous mixture comprising oxygen, such as, for example, air. The duration of the heat treatment can be between 5 minutes and 24 hours, preferably between 30 minutes and 15 hours, so that at the end of this treatment, the chromium compound is at least partially in the hexavalent state. The proportion by weight of chromium in the catalyst obtained in this way is generally between 0.05 and 30% and preferably between 0.1 and 3%. The granular supports based on a refractory oxide which are used in the preparation of the catalysts according to the invention generally take the form of solid particles whose weight-average diameter can be between 20 and 300 microns.

The catalyst activation operation can be carried out in the presence of fluorine compounds selected from ammonium hexafluorotitanate, tetrafluoroborate and hexafluorosilicate, and, if appropriate, in the presence of a titanium compound selected from titanium alcoholates. The catalysts prepared in this way contain fluorides and titanium oxide. The proportions by weight of fluorine and titanium in these catalysts can be between 0.05 and 8% and, respectively, 0.1 and 20%.

Advantageously, the catalyst used in the process of the invention can be employed in the form of a prepolymer. This can be prepared in a prepolymerization step which consists in bringing the catalyst based on chromium oxide into contact with at least one alpha-olefin having from 2 to 12 carbon atoms. The prepolymerization can be carried out in one or more steps, either in suspension in a liquid hydrocarbon medium, or in the gas phase in a reactor with a fluidized bed and/or a bed provided with a mechanical agitating system, at a temperature preferably of between 40° and 115° C. The prepolymerization can advantageously be carried out in the presence of at least one organometallic compound of a metal of groups I to III of the Periodic Table of the elements, such as an organoaluminium, organomagnesium or organozinc compound. In general, the prepolymerization is continued until the prepolymer contains from $10^{-5}$ to 3 and preferably from $10^{-3}$ to $10^{-1}$ millimols of chromium per gram of prepolymer.

The catalyst is introduced into the reactor in the form of a dry powder or in suspension in an inert liquid hydrocarbon. It is introduced at a constant rate but can be introduced continuously or intermittently.

To increase the yield of the polymerization reaction, an organometallic compound of a metal of groups I to III of the Periodic Table of the elements is advantageously introduced into the reactor, independently of the catalyst. The organometallic compound independent of the catalyst can be introduced into the polymerization reactor at a constant rate. The ratio of the rate of introduction of this independently introduced organometallic compound to the feed rate of alpha-olefin expressed in millimol of organometallic compound per kilogram of alpha-olefin, is generally less than 0.2 and most frequently between 0.03 and 0.1.

The polymerization is carried out continuously in a gas phase polymerization reactor, which can be a reactor with a fluidized and/or mechanically agitated bed, by techniques known per se and using equipment such as that described in French patent no. 2 207 145 or French patent no. 2 335 526. The process is particularly suitable for very large industrial reactors. Generally the gaseous reaction mixture leaves through the top of the reactor and is recycled to the reactor through a recycle conduit and a compressor. During this recycling, the gaseous mixture is generally cooled with the aid of a heat exchanger so as to remove the heat produced during the polymerization reaction. The polymerization reaction is generally carried out at a temperature of between 0° and 130° C.

The process is suitable for the polymerization of one or more alpha-olefins containing from 2 to 12 carbon atoms, in particular for the polymerization of ethylene. It is particularly suitable for the copolymerization of ethylene with at least one alpha-olefin containing from 3 to 12 carbon atoms. The gaseous reaction mixture can contain hydrogen and an inert gas selected for example from nitrogen, methane, ethane, butane, isobutane. When a fluidized bed reactor is used, the fluidization velocity of the gaseous reaction mixture passing through the fluidized bed is preferably from 2 to 8 times the minimum fluidization velocity, i.e. generally from 20 to 80 cm/s. The polymer manufactured is withdrawn from the polymerization reactor continuously or intermittently and, preferably, at a constant rate.

According to the present invention a condition of the process can be kept constant at a predetermined value by means of a process control computer which is connected to means of control capable of maintenaing the condition at the predetermined value. This condition can be a ratio between two partial pressures.

The present invention is illustrated below with reference to the drawing, which is a schematic representation of a fluidized bed polymerization reactor suitable for use in the present invention.

Drawing schematically shows a fluidized bed gas phase polymerization reactor (1) consisting essentially of a vertical cylinder (2) surmounted by a disengagement chamber (3) and provided in its lower part with a fluidization grid (4) and with a recycling line (5) connecting the top of the disengagement chamber to the lower part of the reactor, located under the fluidization grid, said recycling line being equipped with a heat exchanger (6), a compressor (7) and feed lines for ethylene (8), butene (9), hydrogen (10) and nitrogen (11). The reactor is also equipped with a prepolymer feed line (12) and a withdrawal line (13).

This reactor operates in such a way that the flow rate of ethylene entering the system via the line (8) is constant and that the flow rate of prepolymer entering the system via the line (12) is also constant.

The Examples below illustrate the present invention.

EXAMPLE 1

Manufacture of a high-density polyethylene

The operation was carried out in a fluidized bed gas phase polymerization reactor such as that shown schematically in the drawing, which consisted of a vertical cylinder 90 cm in diameter and 6 m in height.

Above the fluidization grid, the reactor contained a fluidized bed kept at 103° C., which had a height of 2.50 m and consisted of 430 kg of a high-density polyethylene powder in the process of being formed. A gaseous reaction mixture containing ethylene, hydrogen and nitrogen, the pressure of which was allowed to vary between 1.55 and 1.65 MPa, passed through this fluidized bed with an ascending fluidization velocity of 0.40 m/s.

A catalyst based on chromium oxide (A), prepared by subjecting a catalyst sold under the trademark "EP 307" by JOSEPH CROSFIELD AND SONS (Warrington, Great Britain), containing 1% by weight of chromium in the form of chromium oxide of the formula $CrO_3$ and 3.8% by weight of titanium in the form of titanium oxide of the formula $TiO_2$, associated with a silica support, to a heat treatment for 4 hours at 815° C., was introduced intermittently with time into the reactor. The catalyst (A) had been converted beforehand to a prepolymer containing 50 g of polyethylene per millimol of chromium and an amount of tri-n-octylaluminium (TnOA) such that the ratio Al/Cr was equal to 1.125±0.005. The rate of introduction of the prepolymer into the reactor was kept constant at 320 g/h.

During the polymerization, ethylene was introduced into the reactor at a regulated and constant rate of 100 kg/h and hydrogen was introduced so as to keep the partial pressure of hydrogen in the gaseous reaction mixture constant at 0.3 MPa.

Under these conditions, 100 kg/h of a polyethylene were produced which has a specific gravity of 0.955, a constant melt flow index, measured at 190° C. under a load of 5 kg, of 1.3 g/10 minutes and a proportion by weight of chromium of 3 ppm, and which consisted of particles with a weight-average diameter of 1200 microns. It was observed over several days of continuous polymerization that the production of polymer remained constant at 100 kg/h, without the formation of agglomerates, and that the quality of the high-density polyethylene manufactured by this process remained constant and very satisfactory, despite variations in the polymerization conditions and especially despite the random variations in the activity of the catalyst and the unpredictable and not easily detectable fluctuations in the impurities brought in by the ethylene and the other constituents of the gaseous reaction mixture.

EXAMPLE 2

Manufacture of a high-density polyethylene

The operation was carried out in a fluidized bed gas phase polymerization reactor similar to that shown schematically in the drawing, which consisted of a vertical cylinder 3 m in diameter and 10 m in height and which comprised an additional heat exchanger which was placed between the bottom of the reactor and the compressor.

Above the fluidization grid, the reactor contained a fluidized bed kept at 106° C., which had a height of 8 m and consisted of 17 tonnes of a high-density polyethylene powder in the process of being formed. A gaseous reaction mixture containing ethylene, hydrogen and nitrogen, the pressure of which was allowed to vary between 1.90 and 2.10 MPa, passed through this fluidized bed with an ascending fluidization velocity of 0.55 m/s.

A catalyst based on chromium oxide (B), prepared by subjecting a catalyst sold under the trademark "EP 307" by JOSEPH CROSFIELD AND SONS (Warrington, Great Britain), containing 1% by weight of chromium in the form of chromium oxide of the formula $CrO_3$ and 3.8% by weight of titanium in the form of titanium oxide of the formula $TiO_2$, associated with a silica support, to a heat treatment for 4 hours at 550° C., was introduced intermittently with time into the reactor. The catalyst (B) had been converted beforehand to a prepolymer containing 50 g of polyethylene per millimol of chromium and an amount of tri-n-octylaluminium (TnOA) such that the ratio Al/Cr is equal to $1.125 \pm 0.005$. The rate of introduction of the prepolymer into the reactor was kept constant at 20.4 kg/h.

During the polymerization, ethylene was introduced into the reactor at a regulated and constant rate of 5300 kg/h and hydrogen was introduced so as to keep the partial pressure of hydrogen in the gaseous reaction mixture constant and equal to 0.3 MPa. 360 millimols per hour of triethylaluminium were also introduced into the reactor at a constant rate.

Under these conditions, 5300 kg/h of a polyethylene were produced which had a specific gravity of 0.952, a constant melt flow index, measured at 190° C. under a load of 5 kg, of 1.3 g/10 minutes and a proportion by weight of chromium of 4 ppm, and which consisted of particles with a weight-average diameter of 900 microns. It was observed over several days of continuous polymerization that the production of polymer remained constant at 5300 kg/h, without the formation of agglomerates, and that the quality of the high-density polyethylene manufactured by this process, especially its melt flow index, remained constant and very satisfactory, despite variations in the polymerization conditions and especially despite the random variations in the activity of the catalyst and the unpredictable and not easily detectable fluctuations in the impurities brought in by the ethylene and the other constituents of the gaseous reaction mixture.

EXAMPLE 3

Manufacture of a linear low-density polyethylene

The operation was carried out in a fluidized bed gas phase polymerization reactor similar to that shown schematically in the drawing, which consisted of a vertical cylinder 3 m in diameter and 10 m in height and which comprised an additional heat exchanger which was placed between the bottom of the reactor and the compressor.

Above the fluidization grid, the reactor contained a fluidized bed kept at 90° C., which had a height of 8 m and consisted of 15 tonnes of a linear low-density polyethylene powder in the process of being formed. A gaseous reaction mixture containing ethylene, but-1-ene, hydrogen and nitrogen, the pressure of which was allowed to vary between 1.90 and 2.10 MPa, passed through this fluidized bed with an ascending fluidization velocity of 0.55 m/s.

A catalyst based on chromium oxide (C), prepared by subjecting a catalyst sold under the trademark "EP 307" by JOSEPH CROSFIELD AND SONS (Warrington, Great Britain), containing 1% by weight of chromium in the form of chromium oxide of the formula $CrO_3$ and 3.8% by weight of titanium in the form of titanium oxide of the formula $TiO_2$, associated with a silica support, to a heat treatment for 4 hours at 815° C., was introduced intermittently with time into the reactor. The catalyst (C) had been converted beforehand to a prepolymer containing 50 g of polyethylene per millimol of chromium and an amount of tri-n-octylaluminium (TnOA) such that the ratio Al/Cr was equal to $1.125 \pm 0.005$. The rate of introduction of the prepolymer into the reactor was kept constant at 22 kg/hour.

During the polymerization, ethylene was introduced into the reactor at a regulated and constant rate of 4600 kg/hour, hydrogen was introduced so as to keep the partial pressure of hydrogen in the gaseous reaction mixture constant and equal to 0.3 MPa, and but-1-ene was introduced so as to keep the ratio of the partial pressure of but-1-ene to the partial pressure of ethylene constant at 0.06 in the gaseous reaction mixture. 300 millimol per hour of triethylaluminium are also introduced into the reactor at a constant rate.

Under these conditions, 4600 kg of a polyethylene were produced which had a specific gravity of 0.924, a melt flow index, measured at 190° C. under a load of 5 kg, of 0.8 g/10 minutes and a proportion of chromium of 5 ppm, and which consisted of particles with a weight-average diameter of 1050 microns. It was observed over several hours of continuous polymerization that the production of polymer remained constant at 4600 kg/h, without the formation of agglomerates, and that the quality of the linear low-density polyethylene manufactured by this process, especially its melt flow index, remained constant and very satisfactory, despite variations in the polymerization conditions and especially despite the random variations in the activity of the catalyst and the unpredictable and not easily detectable fluctuations in the impurities brought in by the ethylene and the other constituents of the gaseous reaction mixture.

We claim:

1. A continuous process for the polymerization of an alpha-olefin having from 2 to 12 carbon atoms, which is carried out in a gas phase polymerization reactor by bringing a gaseous reaction mixture, containing the alpha-olefin to be polymerized, into contact with a catalyst based on chromium oxide associated with a granular support and activated by a heat treatment, said process being characterized in that the polymerization reactor is fed with (a) alpha-olefin and (b) catalyst at constant rates, and the total pressure in the polymerization reactor is from 0.5 to 5 MPa and can vary freely between a predetermined maximum pressure and a predetermined minimum pressure and the polymerization rate is regulated by variations in the partial pressure of the alpha-olefin in the polymerization reactor.

2. A process according to claim 1, characterized in that the feed rate of alpha-olefin is kept constant with the aid of a flow regulating system.

3. A process according to claim 1, characterized in that a chain limiter is introduced into the polymerization reactor so as to keep the partial pressure of chain limiter constant in the gaseous reaction mixture.

4. A process according to claim 1, characterized in that a comonomer is introduced into the polymerization reactor at a rate which enables the ratio of the partial pressure of comonomer to the partial pressure of alpha-olefin to be kept constant in the gaseous reaction mixture.

5. A process according to claim 1, characterized in that an organometallic compound of a metal of groups I to III of the Periodic Table of the elements is introduced, separately from the catalyst, at a constant rate.

6. A process according to claim 1, characterized in that the catalyst comprises, apart from a chromium oxide compound, titanium oxide in an amount such that the proportion by weight of titanium in said catalyst is between 0.1 and 20%.

7. A process according to claim 1, characterized in that the proportion by weight of chromium in the catalyst is between 0.05 and 30%.

8. A process according to claim 1, characterized in that the catalyst is introduced into the polymerization reactor in the form of a prepolymer.

9. A process according to claim 1, characterized in that the polymerization is carried out in a fluidized reactor under a pressure of 0.5 to 5 MPa and at a temperature of between 0° and 130° C.

10. A process according to claim 1 characterized in that a condition of the process is kept constant at a predetermined value by means of a process control computer.

11. A process according to claim 1, characterized in that the maximum variation in the total pressure is less than 0.3 MPa.

12. A process according to claim 1, characterized in that the maximum variation in the total pressure is less than 0.1 MPa.

13. A continuous process for the polymerization of an alpha-olefin having from 2 to 12 carbon atoms, which is carried out in a gas phase polymerization reactor by bringing a gaseous reaction mixture, containing the alpha-olefin to be polymerized, into contact with a catalyst based on chromium oxide associated with a granular support and activated by a heat treatment, said process being characterized in that the polymerization reactor is fed with (a) alpha-olefin and (b) catalyst at constant rates, and the total pressure in the polymerization reactor is from 0.5 to 5 MPa and can vary freely provided that the maximum variation in the total pressure is less than 0.3 MPa.

14. A process according to claim 13, characterized in that the maximum variation in the total pressure is less than 0.1 MPa.

* * * * *

UNITED STATES PATENT AND TRADEMARK OFFICE
CERTIFICATE OF CORRECTION

PATENT NO. : 5,306,792
DATED      : April 26, 1994
INVENTOR(S) : LASZLO HAVAS and CLAUDINE LALANNE-MAGNE It is certified that error appears in the above-identified patent and that said Letters Patent is hereby corrected as shown below:

Col. 1, l. 13, change "the" to --The--

Col. 1, l. 16, after "the alpha-olefin" and before "alpha-olefins" delete --or alpha--

Signed and Sealed this

Ninth Day of August, 1994

Attest:

BRUCE LEHMAN

Attesting Officer    Commissioner of Patents and Trademarks